United States Patent
Bartels et al.

(10) Patent No.: US 8,087,191 B2
(45) Date of Patent: Jan. 3, 2012

(54) DEVICE FOR THE PIXEL-INTEGRATED RETURN OF FLUID

(75) Inventors: Frank Bartels, Hattingen (DE); Andriy Bitman, Dortmund (DE); Dieter Jerosch, Bad Soden (DE)

(73) Assignee: advanced display technology AG, Appenzell (CH)

( * ) Notice: Subject to any disclaimer, the term of this patent is extended or adjusted under 35 U.S.C. 154(b) by 379 days.

(21) Appl. No.: 12/426,992

(22) Filed: Apr. 21, 2009

(65) Prior Publication Data
US 2009/0262410 A1    Oct. 22, 2009

(30) Foreign Application Priority Data
Apr. 22, 2008 (DE) .......................... 10 2008 020 131

(51) Int. Cl.
G09F 19/00 (2006.01)
A63H 3/52 (2006.01)
A01K 63/00 (2006.01)
B65G 53/28 (2006.01)
F21V 33/00 (2006.01)
G02B 26/02 (2006.01)
E03B 9/20 (2006.01)
B05B 17/08 (2006.01)
F21S 8/00 (2006.01)

(52) U.S. Cl. .............. 40/406; 40/407; 40/408; 446/267; 119/253; 119/261; 406/106; 406/105; 362/101; 362/96; 359/228; 239/16; 239/17; 239/18; 239/20; 239/23

(58) Field of Classification Search ................ 40/406, 40/407, 408; 446/267; 119/253, 261; 406/106, 406/105; 362/101, 96; 359/228; 239/16, 239/17, 18, 20, 23
See application file for complete search history.

(56) References Cited

U.S. PATENT DOCUMENTS

| | | | | |
|---|---|---|---|---|
| 3,795,225 A | * | 3/1974 | Ogui | 119/248 |
| 3,842,531 A | * | 10/1974 | Sloan | 446/267 |
| 4,156,401 A | * | 5/1979 | Ogui | 119/259 |
| 7,410,309 B2 | * | 8/2008 | Viinikanoja et al. | 396/457 |

FOREIGN PATENT DOCUMENTS
EP     1839866 A2    10/2007

OTHER PUBLICATIONS

K. Blankenbach, A. Schmoll, A. Bitman, F. Bartels, D. Jerosch: "High Reflective & Bi-Stable Electrowetting Displays," Special Section on Extended Papers Selected From the 2007 SID Symposium, Journal of the Society for Information Display, Feb. 2008, vol. 16, Issue 2, pp. 237-244.

L. Riegger, M. Grumann, J. Steigert, R. Zengerle, J. Ducrée: "Microfludics on a Conventional, 10-$ CD-Rom Drive: All-In-One Determination of the Hematocrit"; The 10th International Conference on Miniaturized systems for Chemistry and Life Sciences (μTAS2006), Nov. 5-9, 2006, Tokyo, Japan.

A. Schmoll, K. Blankenbach, A. Bitman, F. Bartels, D. Jerosch: "Droplet Driven Electrowetting Displays," Feb. 2007.

* cited by examiner

*Primary Examiner* — Anne Marie Boehler
*Assistant Examiner* — Syed A Islam
(74) *Attorney, Agent, or Firm* — Marshall & Melhorn, LLC

(57) ABSTRACT

An apparatus for the pixel-integrated return of fluid in the pixel of a fluidic display is characterized in that the fluid with which the desired information is to be displayed and/or the carrier fluid in which the fluid is optionally embedded can be returned in a particularly compact manner and in a manner which is invisible to an observer past the visible part of a pixel (image compartment) into a reservoir (reservoir compartment) through or out of the reservoir. The device comprises an image compartment, a reservoir compartment, a connecting duct and at least one return duct, whereby the at least one return duct is formed by the fact that the connecting duct has at least one area with an uninterruptedly enlarged cross section which transitions in a specified manner into the cross section of the original cross section.

12 Claims, 2 Drawing Sheets

DEVICE FOR THE PIXEL-INTEGRATED RETURN OF FLUID

BACKGROUND OF THE INVENTION

This invention relates in general to the field of display instruments, and in this case the specific field of displays which present images or information which in the normal cases is composed of a plurality of individual pixels, and in which, at a sufficient distance from the display, the individual pixels optically merge into a single overall image. In particular the invention relates to such displays in which the representation is based on the use of fluids, which are also called fluidic displays.

In concrete terms the invention relates to a device for the pixel-integrated return of fluid in the pixel of a fluidic display, and is characterized in that the fluid with which the desired information is to be displayed and/or the carrier fluid in which the first fluid is optionally embedded can be returned in a particularly compact manner and invisibly for an observer past the visible portion of a pixel (image compartment) into a reservoir (reservoir compartment) through or out of said reservoir.

The prior art describes display instruments which, for the presentation of images or information, use colored, e.g. black fluids which, depending on the state of the individual pixel, are visible, i.e. "turned on", or invisible, i.e. "turned off". Different technologies can be used for the switching of the image. One requirement that all the technologies have in common is that the colored fluid must be able to assume the states "visible" and "invisible". For the switch from "on" to "off", the fluid can change either its color or its contrast or disappear from the field of vision of an observer. This process must also be reversible, so that the fluid can change back into the "on" state.

For the case of the disappearance of the fluid from the observer's field of view, the fluid must be moved. The prior art also describes various technologies for this purpose. Special preference is given to pumps or the electrowetting effect. In general, the colored liquid is embedded in an additional fluid with which it is immiscible, so that a two-phase mixture is formed. Devices are also known in which the carrier fluid is a fluid such as oil, for example, as well as devices in which the colored fluid is in a gaseous carrier fluid, such as in air or a cover gas, for example.

The colored fluid is first located in a space provided for the purpose, the contents of which are visible to an observer. This space is referred to below as the image compartment. For the displacement of the colored fluid from the observer's field of view, sufficient space must be provided to hold the fluid temporarily, namely until the next change of the switching state of the pixel to "on". In the normal case, this space is provided in the form of an appropriately sized reservoir which is located outside the observer's field of view. To allow the fluid to get into this reservoir, which is also called the reservoir compartment below, a corresponding connecting duct must also be provided which connects the pixel or the image compartment with the reservoir or the reservoir compartment. The connecting duct can thereby be realized both without and with a taper.

If the fluid is transported by a means that works unidirectionally such as, for example, a one-way pump, it must be possible to transport the colored fluid and optionally the carrier fluid in a circuit, unless the fluid is to be transported into and out of the observer's field of view only once. As a result of the rotating change of colored fluid and (colorless) carrier fluid, the pixel is turned on and off. In this context, we can speak of the connecting duct as well as of a return duct, because the liquids or fluids are returned through this duct in the circuit to the pixel, i.e. into the image compartment.

The problem thereby encountered is that sufficient space must be provided for the above mentioned return duct. At least the return duct plus the reservoir must be sized so that both together can hold all of the colored fluid, so that the fluid can disappear completely from the observer's field of view or from the image compartment.

In the case of a flat construction, in which it is impossible to work in any depth and to thereby take advantage of the third dimension, the inescapable result is that the reservoir compartment and return duct together take up at least as much surface area as the actual (visible) pixel or the image compartment. Consequently there is an unsatisfactory ratio between active (i.e. optically switchable) and inactive (i.e. optically invariable) surface area. The result is poor contrast and a resolution that is in need of improvement (number of pixels per unit of area).

To resolve the problem of the high consumption of surface area, it is desirable to transport the colored fluid and optionally the carrier fluid in one and the same duct, whereby in this regard care must be taken to ensure that the two fluids are not mixed with one another. An approach of this type is described, for example, in L. Riegger et al.: "MICROFLUDICS ON A CONVENTIONAL, 10-$ CD-ROM DRIVE: ALL-IN-ONE DETERMINATION OF THE HEMATOCRIT"; The 10th International Conference on Miniaturized systems for Chemistry and Life Sciences (µTAS2006), Nov. 5-9, 2006, Tokyo, Japan. The authors use a blind duct with a rounded end, which on account of a specified shaping pulls fluid which is input on one edge in the opening area of the duct by means of the capillary effect first on one wall of the duct toward the closed end, whereby the fluid then flows back to the opposite wall, and only after the wall has been almost completely wetted is the remaining gas inside the duct displaced toward the output. The background of the invention is the desire to be able to fill a blind duct of this type without bubbles. As a result of this skillful utilization of the capillary effect, it is therefore temporarily possible to contain two fluid paths flowing past each other in parallel in a single duct volume, without the requirement for partitions or other separating walls. However, the shape of the duct is selected so that the duct is ultimately completely filled by the fluid, whereby the fluid fronts come into contact and finally merge with each other. However, this mixing is not desirable with regard to the problem addressed by the current invention, because the colored fluid and the carrier fluid must remain separated from each other at all times.

SUMMARY OF THE INVENTION

The object of this invention is accordingly to provide a device with which the fluid that is to be used to display the desired information and/or the carrier fluid in which the first fluid is optionally embedded can be returned in a particularly compact manner and invisibly to an observer past the visible part of a pixel or past the image compartment of a fluidic display into a reservoir compartment through or out of this reservoir compartment into the image compartment.

The invention teaches that this object can be accomplished by the device described in claim 1. Accordingly, the invention teaches a device for the compact return of a color fluid and/or of a carrier fluid into a pixel inside a fluidic display which comprises an image compartment, a reservoir compartment, a connecting duct and at least one return duct, whereby the at least one return duct is formed because the connecting duct has at least one area which has an uninterruptedly enlarged cross section which transitions in a specified manner into the cross section of the original cross section.

Additional preferred embodiments are described in the dependent claims and in the following detailed description and the accompanying figures.

DETAILED DESCRIPTION OF THE INVENTION

Figure 1:
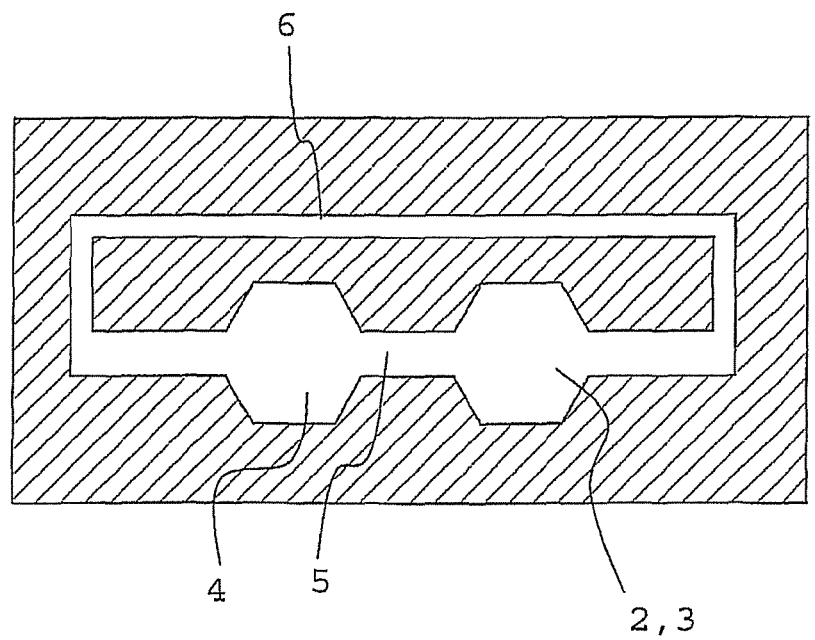
FIG. 1 shows a device in which the return duct is located as in the prior art.

The object of the invention is to provide a device with which a colored fluid with which the desired information is to be displayed and/or a carrier fluid in which the first fluid is optionally embedded, can be returned in a particularly compact manner and invisibly for an observer past the visible part of a pixel or past the image compartment of a fluidic display into a reservoir compartment through or from the reservoir compartment into the image compartment.

The invention is thereby based on the effect of capillarity, which is a term used to describe the behavior of fluids which is exhibited when they are in contact with capillaries, e.g. narrow tubes, gaps or cavities. These effects are caused by the effect of the surface tension of the fluid itself and the boundary surface tension between the fluid and the solid surface. In general, a fluid will attempt to spread out on the material of the capillary vessel (capillary ascension). This behavior is due to the adhesion effect, i.e. the force that acts between two substances. In the well-known experiment in which water in a glass capillary, i.e. a small-diameter tube, ascends against the force of gravity, the capillary rise h can be calculated as a function $$h = \frac{2\sigma \cdot \cos\theta}{\rho \cdot g \cdot r}$$

where $\sigma$ is the surface tension, $\theta$ is the contact angle, $\rho$ is the density of the fluid, g the acceleration caused by gravity and r the radius of the capillary tube.

The capillary effect, however, is observed not only in tubes, but also on more or less sharp edges. For example, fluid is also drawn in against the force of gravity when the capillary has an open, U-shaped or L-shaped profile. The more acute the angle enclosed by the cross section profile, the greater the capillary force and the greater the capillary rise. In the case of a U-shaped profile, an additional, technically relevant case can also be described which results when the two parallel surfaces of the U-shaped profile are far enough apart. In this case, the capillary force or the capillary pressure which is independent of the surface area is determined practically exclusively by the distance between the two parallel surfaces. Significant capillary forces result only at distances of a few millimeters; in the range of micrometers (μm). The forces can increase to such an extent that plates with a think liquid intermediate layer are almost inseparably connected with each other. In these cases the evaporation of the fluid from the lateral spaces which leads to an easier separation becomes even more difficult because of the narrowness of said lateral spaces.

The reverse effect occurs when fluid which can initially creep along an essentially plane surface encounters a step or a bend in this surface which is at a certain angle. To the extent that the angle is measured on the side which is wetted by the fluid, an angle of exactly 180 degrees corresponds to a flat surface, and an angle of more than 180 degrees to the above mentioned step or bend. This angle can then by definition be up to 360 degrees; in practical terms, however, that would correspond to a complete reversal of direction by a wetting of the back side of the surface. One technical example is the end of a capillary tube which has a length that is less than the capillary rise of the fluid in it. On account of the "capillary discontinuity" which occurs when the fluid leaves the uniformly shaped interior side of the tube, which then ends abruptly, it can become impossible for the fluid, depending on the additional parameters described above, to overcome this discontinuity. The fluid remains to a certain extent "trapped" in the capillary tube, although it of course bulges out to some extent beyond the end of the capillary, although it does not wet the outside of the capillary.

This invention utilizes in particular the effect of the capillary discontinuity, which prevents a fluid present in a duct from leaving certain areas specified for the fluid. This invention additionally utilizes the effect of capillary ascension, which ensures that the fluid in a duct is kept in the areas provided for it.

For this purpose the invention uses what it called a return duct which is realized congruently with the connecting duct which connects the image compartment with the reservoir compartment, whereby the return duct, however, has a cross section which is at least partly different from that of the connecting duct. The difference in the cross section must thereby be capable of forming a "capillary barrier", the purpose of which is to ensure that fluid which is in the areas of the cross section of the connecting duct cannot leave these areas because the capillary forces acting on the cross section transition are significantly less than the capillary forces that keep it in the corresponding duct ("capillary discontinuity").

The invention is embodied in a device which is used for the compact return of a colored fluid and/or of a carrier fluid into a pixel inside a fluidic display. The device thereby comprises:

an image compartment in which some or all of the colored fluid can be contained and the contents of which are visible to an observer;

a reservoir compartment in which some or all of the colored fluid can be contained and the contents of which are not visible to an observer;

a connecting duct which creates a fluidic between the image compartment and the reservoir compartment, at least one return duct which creates a fluidic between the image compartment and the reservoir compartment.

The image compartment is thereby that part of the device which is used for the actual display of the information. The information can consist of the display of an individual pixel, which can be round or square, for example. However, the image compartment can also have another shape which is capable of displaying a higher degree of information, such as a symbol or similar character, for example, which is visible to the observer only by means of the uptake of the colored fluid, or which becomes invisible by the uptake of the colored fluid (e.g. because the color of the fluid and the color of the surrounding material are identical).

The reservoir compartment claimed by the invention is used to hold the colored fluid or a portion of the colored fluid which is great enough that after the reservoir compartment is filled, the image compartment can be considered to be essentially "empty". The shape of the reservoir compartment can therefore be designed without any restriction within broad limits, although it can preferably have the same depth as the image compartment, whereby the term "depth" as used here means the clear distance between its surfaces that are oriented perpendicular to the direction of view of an observer ("main observation direction").

The task of the connecting duct is to create a fluidic between the image compartment and the reservoir compartment. The orientation and shape of the connecting duct can essentially be selected without restriction, although preference is given to orientations and shapes which can be realized in a particularly compact manner. In particular, the invention teaches that it is preferably for the depth of the connecting duct to be essentially equal to the depth of the compartment or compartments, whereby in this case, too, the definition of the term "depth" given above applies.

The at least one connecting duct forms a fluidic between the image compartment and the reservoir compartment. The position and shape of the return duct, in contrast to the connecting duct, can no longer be selected without restriction, but must meet certain requirements claimed by the invention.

Accordingly, the invention teaches that the at least one return duct is formed by the fact that the connecting duct has at least one area with an uninterrupted enlarged cross section. In other words, the return duct is to a certain extent part of the connecting duct, although it differs from the connecting duct in terms of a larger cross section. There is accordingly a "main duct" which is connected to at least one "secondary duct", and with which the main duct has at least one wall in common, so that this very same wall is only virtual but is not actually realized or physically present. It is thereby initially irrelevant at what point of the cross section of the connecting duct this larger cross section by which the return duct is formed is located. Likewise it is initially irrelevant whether there is only one or a plurality of such cross section enlargements, provided that the distinction between the two cross sections is preserved. As a result of the creation of an area with an enlarged cross section, the above mentioned effect of capillary ascension or capillary discontinuity is utilized so that fluid which is in the "narrow" portion of the duct volume, which the invention teaches corresponds to the return duct, cannot get into the "wide" area, which the invention teaches corresponds to the connecting duct.

"Uninterruptedly" enlarged thereby does not mean that the enlargement remains the same over the entire length of the connecting or return duct. Rather, it is altogether possible that, for example, the position and/or the actual size of the variation of the cross section is not uniform along the flow path. All that is essential is that the cross section variation can at no point be so small that a capillary discontinuity is formed and/or the capillary ascension is reduced to the extent that the function claimed by the invention is interrupted.

In one preferred embodiment of the device claimed by the invention, the transition of the cross section of the connecting duct in the areas with an enlarged cross section is realized essentially with a sharp edge. That means that there must be no rounded corners, the radii of which are on the same order of magnitude or an even higher order of magnitude then the geometries of the cross section. Under some conditions, rounded edges of this type can cause the capillary discontinuity or the capillary ascension to no longer be sufficient to guarantee the spatial separation between the two fluids (colored fluid and carrier fluid).

In an additional preferred embodiment, the transition from the area of the original cross section into the area with the enlarged cross section is slightly rounded on one or more edges. "Slightly rounded" means that the radius of the rounding is approximately one order of magnitude less than the difference between the area with the enlarged cross section and the area with the original cross section. If the area with the enlarged cross section has a width of 10 mm, for example, and the area with the original cross section a width of 6 mm, the difference is 4 mm, and a rounded edge which is approximately one order of magnitude less would therefore have a radius of approximately 0.4 mm.

In one particularly preferred embodiment of the invention, the transition between cross sections is realized essentially in the form of a right angle. Accordingly, both the connecting duct and the return duct have an essentially rectangular cross section and the cross sections are essentially oriented parallel to each other.

In an additional preferred embodiment of the invention, the shape of the enlarged cross section is essentially a wedge. It is also possible to achieve the effects required by the invention with a wedge-shaped configuration of the enlarged cross section. In particular in the outer peripheral area of the enlarged cross section where an acute angle exists on account of the wedge shape, the capillary ascension is great enough that two fluids claimed by the invention can be separated.

In an additional preferred embodiment, the return duct is located essentially symmetrically between the two walls of the connecting duct which are oriented perpendicular to a main observation direction. The main observation direction is once again the direction from which an observer views the image compartment to be able to see as much of its surface as possible. Accordingly, the two walls in question run essentially parallel to this viewing direction. The position of the return duct must thereby be sized so that it is located essentially in the central area of the connecting duct, i.e. so that the distance between the boundary surface of the connecting duct facing an observer and a boundary surface of the return duct facing the same observer is essentially equal to the distance between the respective sides of the corresponding ducts farther from the observer.

It is particularly preferable if an additional return duct is present, which is formed symmetrical to the first return duct with respect to a plane which runs parallel to the direction of view of an observer and also divides the connecting duct along its length into two halves of equal size. Accordingly, each particularly preferred return duct has a partner with which it is symmetrical with respect to the above mentioned plane.

In an additional preferred embodiment, the invention teaches that the at least one return duct is located essentially on one of the two walls of the connecting duct oriented perpendicular to a main observation direction. In other words, the position of the return duct lies either directly on the boundary surface of the connecting duct facing an observer or coincides exactly with the position of a boundary surface of the connecting duct that faces away from an observer. In an additional preferred embodiment, a return duct is located essentially on each of the walls of the connecting duct which are oriented perpendicular to a main observation direction, and between them there is an area of the original cross section. This variant therefore corresponds to a combination of the two variants described above. Accordingly, there are exactly two return ducts which are located both on the boundary surface of the connecting duct facing the observer and on the boundary surface facing away from the observer.

In one preferred embodiment, the connecting duct and the reservoir compartment are present in the form of two functionally separate components. In an additional embodiment, both the connecting duct and the reservoir compartment are represented by essentially the same component. In other words, the volume of the connecting duct, together with the volume of the return duct, is sufficient to hold the contents of the image compartment at least almost completely, so that no additional space, such as a separate reservoir compartment, for example, is required. This variant is particularly compact because it is possible to completely eliminate the separate component of the reservoir compartment. All that is necessary is to ensure that at the end of the connecting duct which is farther from the image compartment, there is a place at which the connecting duct can transition into the return duct. This transition can be a 180 degree bend, for example, in connection with a correspondingly smoothly configured cross section transitions.

In an additional preferred embodiment of the device claimed by the invention, the connecting duct and/or the return duct is/are provided in whole or in part with a coating that repels and/or attracts the colored fluid and/or a coating that repels and/or attracts the carrier fluid. In particular it is advantageous if the areas in which the corresponding fluids must move are preferably coated with corresponding coatings that attract these fluids, and analogously it is likewise advantageous, alternatively or additionally to coat those areas which are not to be wetted by these fluids with coatings that repel the corresponding fluids. It is particularly preferable if such areas which can be provided with a repellant coating are the boundary areas of the two cross sections (connecting duct and return duct). The other areas are particularly preferably those that can be provided with an attractive coating.

In an additional preferred embodiment of the invention, these coatings can be alternatively or additionally applied in one or both compartments.

In one additional preferred embodiment, the connecting duct and the return duct are essentially straight. "Essentially straight" means that the flow path of a fluid flowing through the duct runs in a linear fashion and in particular does not need to be conducted around corners or edges. It is particularly preferable for both ducts to be completely straight.

In an additional preferred embodiment of the device claimed by the invention, the connecting duct has a length in the range of 0.1 to 5 mm and a width in the range of 0.1 to 5 mm and a height in the range of 0.1 to 3 mm. That also means that the geometry of the connecting duct remains essentially uniform along its length.

In an additional preferred embodiment of the device claimed by the invention, the at least one return duct has a width which is 0.1 to 3 mm greater than the width of the connecting duct and a height which is 1% to 50% of the height of the connecting duct. According to this formula, the width of the return duct equals the width of the area with the enlarged cross section, which however also comprises the area with the original cross section, i.e. the width of the connecting duct. Accordingly, the difference between the width of the two cross sections is exactly the above mentioned 0.1 to 3 mm. The height of the return duct claimed by the invention in relation to the height of the connecting duct can be relatively small, although the invention teaches that it is likewise possible to allow the height of the interior area to increase into the range of the height of the connecting duct. It is particularly preferable if the additional flow cross section which is also present as a result of the area with the enlarged cross section equals that of the area with the original cross section if the carrier fluid is not a gas but a liquid, because in that case it is essential for the fluid flowing through the return duct not to be opposed by any fluidic resistance which is greater than the fluidic resistance of the fluid which is flowing in the connecting duct. Otherwise, it could potentially be necessary to expect that the fluid flowing in the return duct might leave the return duct on account of the high fluidic resistance, which would in turn be caused by too small a cross section of the return duct. The cross section of the return duct in this case means exclusively the cross section surface which is added to the original cross section surface (that of the connecting duct) by the expanded cross section claimed by the invention.

With regard to the dimension of the return duct which is described by the term "width", which runs both perpendicular to the viewing direction of an observer and also perpendicular to the direction of the flow path in the return duct, it is particularly preferable if both the at least one return duct as well as the image compartment and the reservoir compartment have essentially the same width. In each case, it is preferable if the width of the at least one return duct is not greater than the width of the corresponding compartments. This requirement also applies accordingly if there are two or more return ducts which, viewed from the observer's direction, are located on both sides of the connecting duct. In this case, it is preferable if the two return ducts together do not exceed the width of the compartments.

FIG. 1 shows a device in which the return duct 6 is located as in the prior art. The figure shows a sectional view which is determined by the direction of view of an observer which is essentially perpendicular to the surface of maximum width of the image compartment 3. The image compartment 3 is simultaneously also the pixel 2. In the vicinity of the image compartment 3 is the reservoir compartment 4. The two compartments 3, 4 are connected to each other by a connecting duct 5. Not shown is a fluid transport device, such as a pump, for example, which is required for the transport of the colored fluid which is also not shown. During the transport of the colored fluid out of the image compartment 3 into the reservoir compartment 4, the fluid originally present (liquid or gas) in the reservoir compartment 4 is displaced out of it. Because the fluidic system is closed, a return duct 6 must be provided which makes possible a corresponding equalization of pressure and volume. As is immediately apparent from FIG. 1, a return duct 6 of the prior art requires a corresponding large amount of space, unless it runs in a variant which is not illustrated in a plane which is located below the two illustrated compartments 3 and 4. An arrangement of this type, however, would be realizable only with a large amount of constructive effort and is therefore to be avoided.

Figure 2:
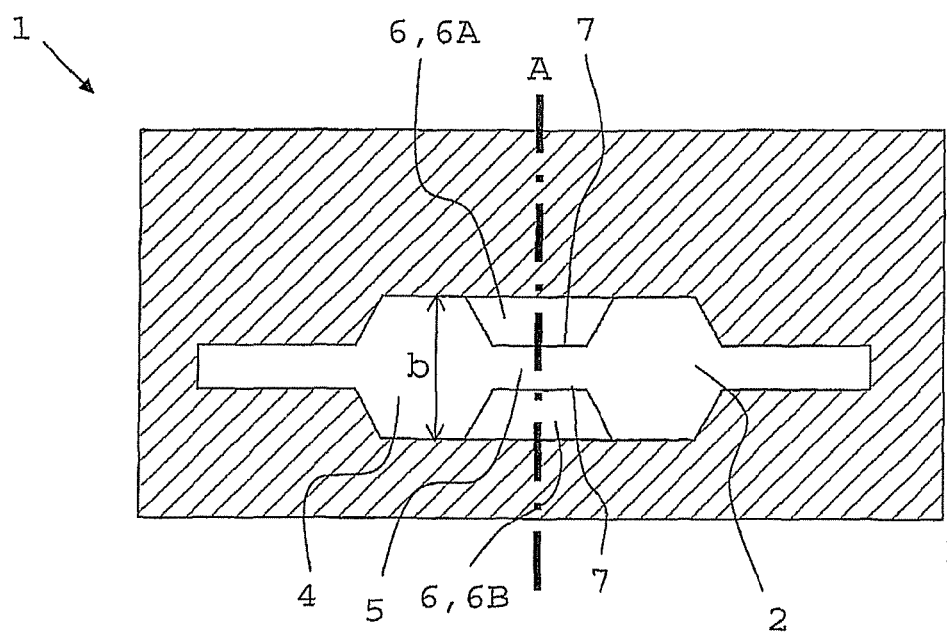
FIG. 2 shows an exemplary embodiment of the device claimed by the invention.

FIG. 2 therefore shows one embodiment of the device 1 claimed by the invention. Here, too, the illustration is in the form of a sectional drawing analogous to FIG. 1. The device 1 again comprises a pixel 2 which is realized in the form of the image compartment 3. It also comprises a reservoir compartment 4 which is fluidically connected with the image compartment 3 by a connecting duct 5. The figure also shows two return ducts 6A, 6B, which are located on both sides of the connecting duct 5 and are essentially symmetrical to the connecting duct 5. The return ducts 6A, 6B are formed by the fact that the connecting duct 5, which represents an area with the original cross section 5, is widened, resulting in an area with a larger cross section 6.

The widening of the area of the original cross section 5 is thereby parallel to the vertically oriented walls 7 which border the connecting duct 5 laterally and also run parallel to the direction of view of an observer.

In the illustrated exemplary embodiment, the dimension b, which describes the width of the compartments, is simultaneously the dimension which describes the width of the area with the enlarged cross section. The invention teaches that it is particularly preferable for these two widths to be identical.

FIG. 2 also shows a section line A, the associated sectional view of which is shown in the next figure.

Figure 3:
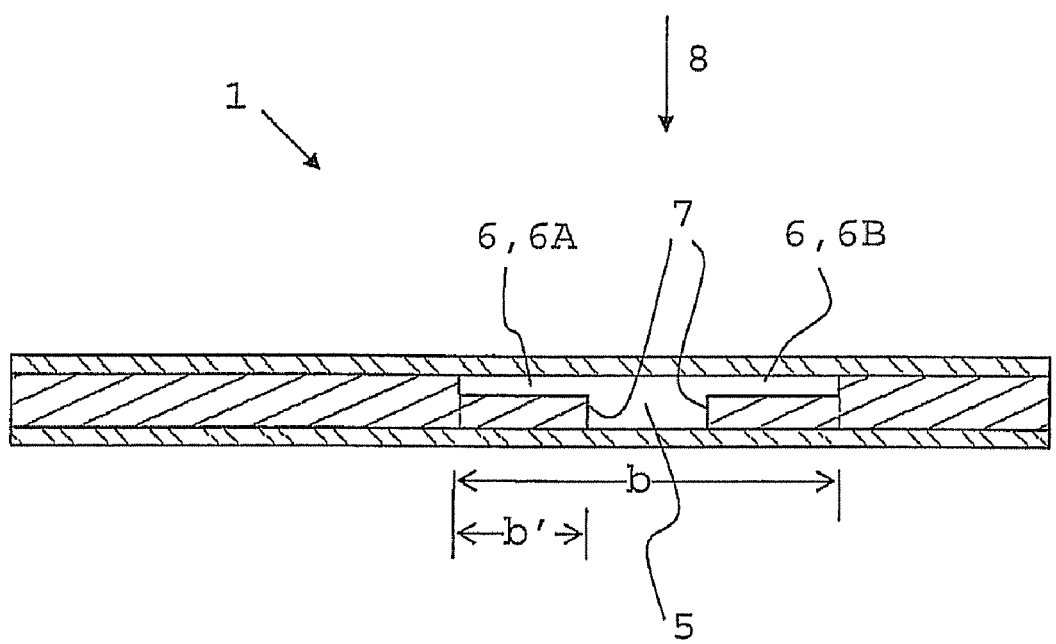
FIG. 3 shows the exemplary embodiment of the device claimed by the invention illustrated in FIG. 2 in a sectional view along section line A.

Accordingly, FIG. 3 shows the embodiment of the apparatus 1 claimed by the invention and illustrated in FIG. 2 in a sectional view along section line A.

Clearly visible in the figure is the area with the original cross section 5 which represents the connecting duct and the area with an enlarged cross section 6 which is divided symmetrically into areas 6A and 6B. The side walls of these two areas run parallel to the lateral and vertically oriented walls 7 of the connecting duct 5 and simultaneously parallel to a main direction of observation 8 of an observer (not shown). The width b of the area with the enlarged cross section 6 extends beyond the width of the area of the original cross section which is not shown in any further detail. It should be added, however, that in particular for he calculation of the capillary fluidic properties of the respective return ducts 6A, 6B, the width of the return duct b' is relevant, which relates only to the corresponding cross section area 6A, 6B.

In the illustrated variant, the transition from the cross section of the area with the original cross section to the areas with the enlarged cross section runs essentially at a right angle. No rounded corners are shown, although the invention teaches that rounded edges are acceptable in certain cases.

In the illustrated exemplary embodiment, the areas with hatch-marks oriented in different directions also indicate different materials or components. However, the invention teaches that it is also possible to manufacture the device claimed by the invention from two-piece or even one-piece components.

LIST OF REFERENCE NUMBERS AND ABBREVIATIONS

| 1 | Device |
|---|---|
| 2 | Pixel |
| 3 | Image compartment |
| 4 | Reservoir compartment |
| 5 | Connecting duct; area with original cross section |
| 6 | Return duct; area with enlarged cross section |
| 6A | First return duct |
| 6B | Second return duct |
| 7 | Perpendicularly oriented walls |
| 8 | Main direction of observation |
| A | Section edge |
| b | Width |
| b' | Width of the return duct |

The invention claimed is:

1. A display device having at least one pixel, comprising:
a colored fluid and a carrier fluid that are immiscible;
an image compartment in which said colored liquid is receivable in part or entirely and the content of which is visible to an observer;
a reservoir compartment in which the colored fluid is receivable in part or entirely and the content of which is visible to an observer;
a connecting duct that fluidically couples said image compartment with said reservoir compartment; and
at least one return duct which fluidically couples said image compartment and said reservoir compartment;
wherein said connecting duct and said return duct are formed as a unitary duct, having in a cross section in a direction perpendicular to a direction of fluid flow along its entire length and along a dimension of said cross section a sharp-edged duct width transition that divides said duct cross section in a first area having a first width and a second area having a second width that it less than that first width thereby forming a capillary leap so that liquid that is contained in said return duct does not reach into said connecting duct.

2. The device according to claim 1, wherein said duct width transition runs along essentially vertical walls.

3. The device according to claim 1, wherein said duct width transition is realized essentially in the form of a right angle.

4. The device according to claim 1, wherein said width of said connecting duct transitions essentially in a wedge-shape into the width of the return duct.

5. The device according to claim 1, wherein said return duct is located essentially symmetrically between the two walls of the connecting duct which are oriented vertically with reference to a main direction of observation.

6. The device according to claim 1, wherein said at least one return duct is located essentially on one of the two walls of the connecting duct which are oriented vertically with reference to a main direction of observation.

7. The device according to claim 1, wherein the return duct is located essentially on each of the walls of the connecting duct which are oriented perpendicular to a main observation direction and an area with the original cross section exists between them.

8. The device according to claim 1, wherein part or all of connecting duct and/or the return duct is or are provided with a coating that repels and/or attracts the colored fluid and/or the carrier fluid.

9. The device according to claim 1, wherein the connecting duct and the return duct are realized so that they are essentially linear.

10. The device according to claim 1, wherein the connecting duct has a length in the range of 0.1 to 5 mm and a width in the range of 0.1 to 5 mm.and a height in the range of 0.1 to 3 mm.

11. The device according to claim 1, wherein the at least one return duct has a width which is 0.1 to 3 mm greater than the width of the connecting duct, and a height which is 1% to 50% greater than the height of the connecting duct.

12. The device according to claim 1, wherein both the at least on return duct and the image compartment and reservoir compartment have essentially the same width b.

* * * * *